FIG.I

United States Patent Office 2,998,020
Patented Aug. 29, 1961

2,998,020
SAFETY-VALVE, WITH A LOCKING JACK, OPERATED BY A DETECTING CHECKING DEVICE
Auguste François Charasse, 1 Impasse JJ Charley, Marseille, France
Filed Oct. 17, 1957, Ser. No. 690,875
Claims priority, application France Oct. 18, 1956
1 Claim. (Cl. 137—102)

Some kinds of safety-valves at present fitted to boilers are relatively delicate devices, difficult to adjust and to keep in good running order. The most common defects are the following:

(a) Deterioration of the valves and of the seats as a result of leaks, particularly due to vibration when the boiler-pressure comes near to the pressure the springs have been calibrated to.

(b) The influence of the heat upon the springs whose calibration may therefore vary.

(c) The difficulty of keeping a valve fully open during discharge, unless the apparatus permits large pressure-differences to be available.

(d) Large and detrimental steam losses.

In the case of piloted valves, the disadvantages pointed out above are also to be found in the pilot, which is nothing other than a calibrated valve.

The present invention has for its object the provision of a safety-valve based on an entirely new principle, and consisting of two devices: (1) the safety valve proper, operated by a pilot valve; (2) the pilot valve, which may be mounted directly on the safety valve, or remote therefrom.

The accompanying drawings show schematically and as a non-limitative example, a construction of safety valve in accordance with the invention.

Figure 1:
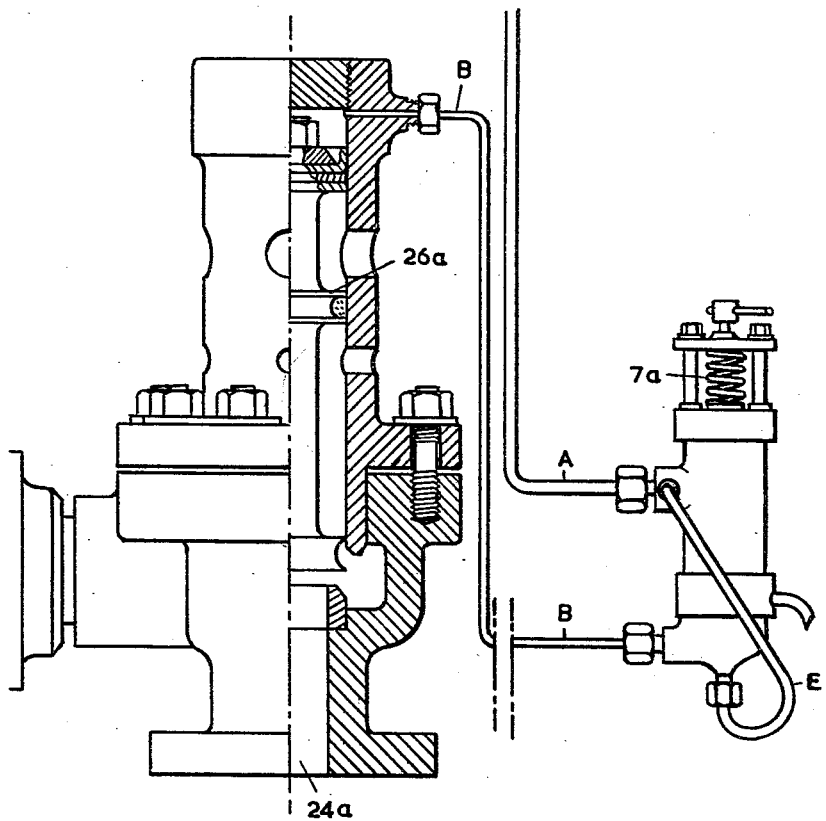
FIG. 1 is a view of the entirety of the safety valve and pilot valve assembly, the safety valve being in vertical axial half-section and in open condition.

Referring to these drawings:

The pilot valve consists of a body made of three parts fitted together: i.e. a body 1, a socket 2 screwed upon it, and a base 3, threaded upon the socket 2.

Into the upper part of the body 1 are threaded the pillars 4 upon which is mounted the crosshead 5 through which a calibration adjusting screw 6 is threaded. This screw holds in place the seat 7 of a calibration spring 7a. This calibration spring bears on a first piston 8 movable in a cylinder bore in the body 1, through the medium of a seat 9. This piston 8 has formed therein a bore 8a and a counter bore 8b with a laterally extending shoulder 8c therebetween. Spring 7a urges piston 8 towards a valve seat 10b in the body 1.

In the piston 8 is placed a valve member having first and second portions 10c, 10d and a laterally extending shoulder portion 10e extending between said portions. This valve member can move in said piston under the action of a weak spring 10a, which urges it towards the seat 10b. When the valve is seated, the shoulders of the valve member and piston are spaced. Accordingly, during initial upward movement of the piston 8 against its spring loading the valve member is kept pressed against the valve seat, but upon further movement of the piston 8 in the same direction the valve member is eventually disengaged from the valve seat. The valve portion 10c is guided by a sleeve 11 threaded on the piston 8 and bearing against a ring 12, which ring itself also holds in place the packing gland of said piston.

In a cylinder chamber 13a of greater diameter communicating with the valve seat there is disposed a piston 13 bearing a packing gland 14 of leather, maintained by a steel washer 15, said washer being fastened by a screw 16 which passes through the end wall 16a of the piston 13 and is threaded into a sleeve 17.

In this sleeve are placed a pushing-finger 18 of the piston and its spring 19. This spring 19 allows the whole of the piston 13 to be lowered a little, when it has made its stroke. After having compressed its spring 17a it abuts against the bottom of the socket 2, in order that the whole force of the piston 13 will not act on the needle 20 through the medium of the valve 21. The spring 19 of the pushing finger 18 is also intended to prevent the valve 21 finding a steady opening point.

The lower part of the socket 2, which is threaded into the base 3, comprises a chamber in which is disposed a valve-guide 22 and a spring 22a. This guide with the help of the spring 22a, holds the valve 21 rested against its seating 21a.

The needle 20 is placed below and contacts the rod of the valve 21, and shuts an orifice 20a when the finger 18 of the piston 13 opens said valve 21, the rod of which pushes said needle 20 downwardly.

Figure 2:
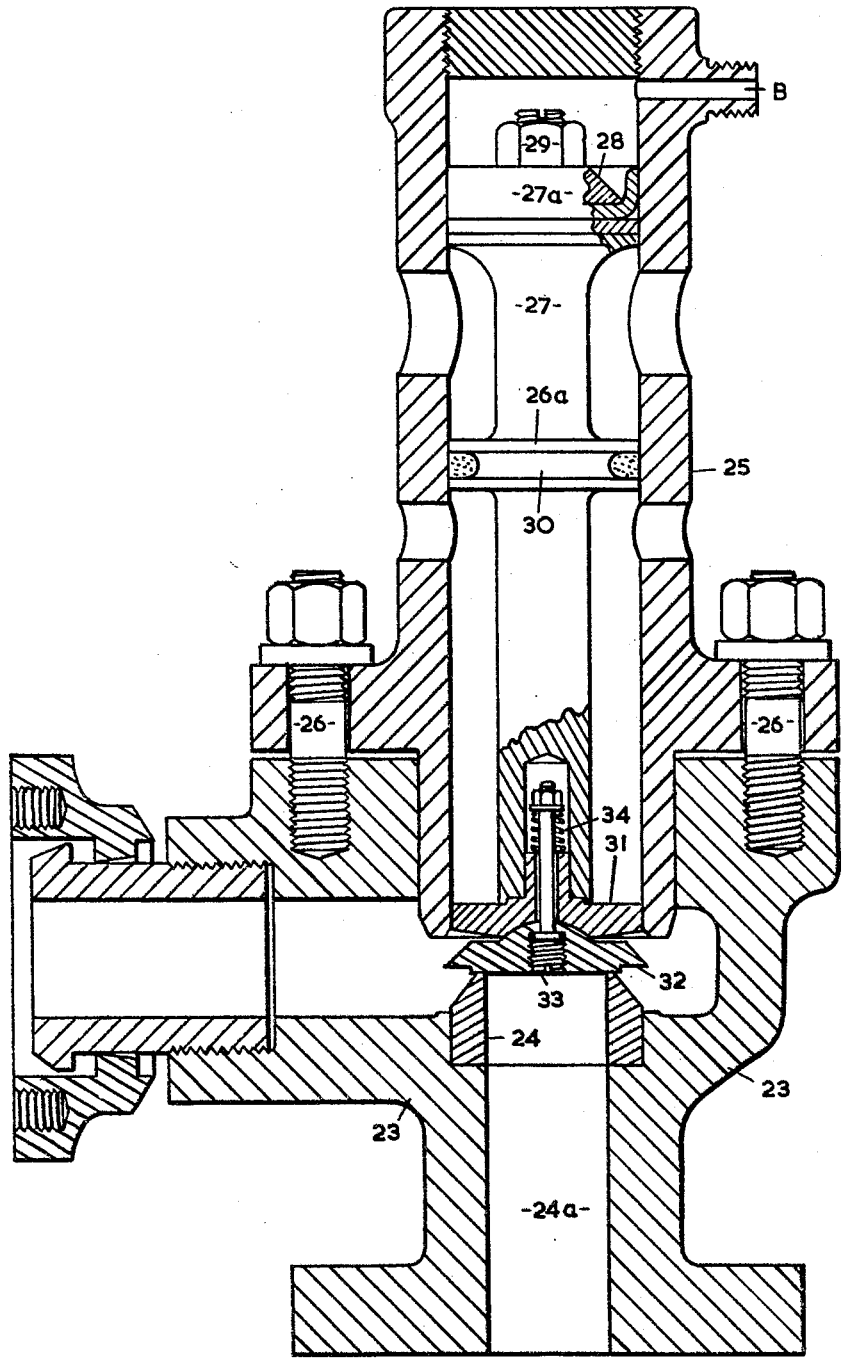
FIG. 2 shows the safety valve to a larger scale, in vertical axial section in closed condition.
Figure 3:
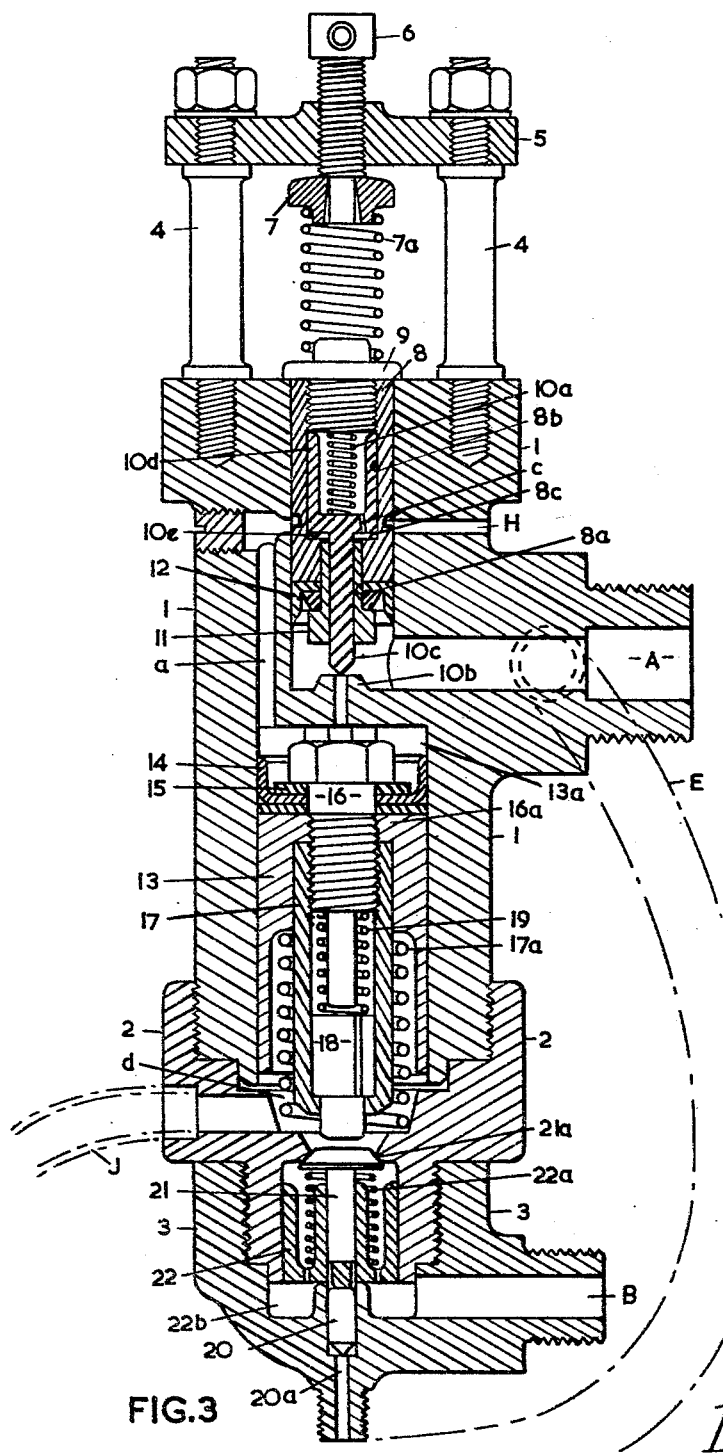
FIG. 3 shows the pilot valve to a still larger scale and in vertical axial section.

Under normal conditions, when the safety-valve is closed, the pilot valve allows the compressed fluid to arrive from the boiler and flow to the valve which is held closed. At this time, all the internal members of the pilot valve are firm in the position shown in FIG. 3. The compressed fluid, which comes from the boiler through the pipe A, operates under the whole of the piston 8—9—10—11—12. The fluid is also led by the shunt pipe E under the needle 20, and therefore, when this latter is pushed off its seating the fluid can flow about the needle (which is a loose fit in its bore) into the chamber 22b under the valve guide 22. The pressure operates in this chamber on the back of the valve 21, the closing of which its assists, and by passing through the pipe B, the pressure passes to the piston which holds the safety valve closed, see FIG. 2.

When the blow-off pressure is reached, the pressure of the fluid which arrived through the pipe A acting on the piston 8—9—10—11—12 overcomes the thrust of the calibration adjusting spring 7a. The piston accordingly moves up, and in the first part of the run of this piston, the valve needle 10c does not follow but remains closing its seat 10b. A conduit "a" opens at one end into the chamber 13a and at the other end to the atmosphere. This conduit "a" includes along its length the counter-bore 8b of the cylinder. The piston 8 has a peripheral recess "c" capable of providing a communication to complete the conduit "a," said recess being positioned on the piston 8 such that when the piston is at rest position under its spring loading the recess "c" completes the conduit "a" and when the piston has moved more than a predetermined distance against its spring-loading, the recess "c" is moved out of correspondence with the conduit and the piston then closes the conduit.

The chamber 13a being thus eventually placed under pressure, the piston 13—14—15—16—17 is pushed downwardly, and by compressing its return spring, comes into a position to bear upon the valve 21. The valve 21, opened by the thrust of said piston 13, the surface of which is much greater, opens the chamber 22b whilst in the same time the rod of the valve 21 pushes back the needle 20, thus closing the inlet orifice 20a. By opening the chamber 22b, the pressure applied previously to the safety valve to hold it closed is reduced, thereby allowing the valve to open and permit blowing off.

The quantity of fluid which passes through the seating 21a of the valve 21 into the chamber "d" is evacuated to atmosphere through the discharge-pipe J.

All the members remain in this condition during the discharge, until the boiler pressure has fallen again to a pressure lower than the calibration pressure. At this moment, the pilot valve closes the safety valve again in the following manner as the pressure coming from the boiler through the pipe A is operating on the pilot valve piston 8 with a force now lower than that of the calibration spring, said piston 8 starts a return stroke and eventually allows the needle 10c to touch its seat 10b. The fluid then no longer passes through the seat closed by the needle. As said piston 8 continues to descend it eventually opens the mouth of the conduit "a" by means of its cylindrical recess "c," whereby the chamber "13b" is set into communication with the atmosphere. The driving-piston 13, pushed by the return spring in the chamber "d," comes back again to its initial position. The finger 18 of the driving piston moves clear of the valve 21 and this latter, pushed upwardly by its spring, closes upon its seat 21a, whilst its rod moves clear of the needle 20. This needle, pushed back by the pressure from its orifice 20a, permits the pressure to re-establish itself in the chamber 22b behind the valve 21. This pressure is transferred through the pipe B to close the safety valve.

The safety valve (see FIGS. 1 and 2) consists of a body 23 in which is placed a seat 24 of hard metal. On the body is seated a cylinder 25, firmly secured by means of bolts 26. In the cylinder 25 is arranged a piston 27 comprising at its upper part a cup washer 27a. This cup washer 27a is held in position on the piston-head by means of a ring 28, fastened by a nut 29. In the middle of the piston rod is provided a flange 26a having a groove 30 to hold a stuffing gland so as to thermally insulate the space above the valve-carrier 31 which also acts as a guide for the piston in the cylinder. The valve 32 is mounted movably on the piston 27 by means of a screw 33 placed under the tension of a spring 34.

The elements 27, 31, 32 could be integral, as shown in FIG. 1.

The safety valve operates as follows:

When the boiler is under the normal pressure, the pilot valve allows the pressure of the boiler to arrive in the upper part of the cylinder 25, as explained precedingly. The piston 27 is pushed downwards and closes the orifice of the seat 24, the valve element 32 being pressed thereon with a force which depends on the boiler pressure and on the surface area of the piston. Said surface area is made greater than that of the orifice which is closed by the valve, so that the thrust of the piston is greater and ensures the closing action. In the example illustrated, the surface area of the piston is more than twice that of the orifice.

When the action of the pilot valve gives rise to a pressure-fall in the top end of the cylinder 25, the compressed fluid arriving through the discharge orifice 24a pushes the valve 32 on piston 27 and opens the valve. The lowered pressure in the space above the piston permits the valve to remain open, so long as the pilot valve does not restore the greater pressure in the space above the piston. When it restores it, the reclosing of the valve is immediate and positive.

The pilot valve device has no consumption of fluid, either during discharge, or during the normal heating when the safety valve is closed.

The pilot valve can operate on the pressure of the steam above the boiler water level, or from a conduit open below the level of the boiler water. By means of a steam-trap, it is possible to communicate the pressure of the boiler to any other fluid, which entering at once into the pilot valve device, operates the safety valve without using either the steam or water of the boiler.

No unbroken stream can establish itself in the pipe A, coming from the boiler to the pilot valve nor in the pipe B connecting the pilot valve to the safety valve. In most cases, these parts would contain only water, and consequently would not be under steam, and would remain at a relatively lower temperature. This permits use of packings of plain rubber, or of other material chosen to withstand the effects of chemicals used instead of water, without needing to take into account any large rises in the temperature.

I claim:

A pilot valve, for controlling flow of fluid under pressure to a fluid-operable device, comprising a cylinder having a port for entry of the fluid under pressure and having a valve seat at one end, a piston having formed therein a bore and a counterbore with a laterally extending shoulder therebetween movable in the cylinder, spring-loading means to urge the piston towards the valve seat, a valve member having first and second portions slidable respectively in the bore and counterbore and having a laterally extending shoulder between said first and second portions and positioned to coact with the valve seat, spring-loading means positioned to act between the piston and the valve member so as to urge the valve member towards the valve seat, stop means limiting the movement of said piston towards said valve seat so as to have the shoulders of the valve member and piston spaced apart when the valve is seated, whereby during initial movement of the piston against its spring-loading the valve member is kept pressed against the valve seat but upon further movement of the piston in the same direction the valve member is eventually disengaged from the valve seat, a chamber communicating with the valve seat for reception of fluid under the control of the valve element, a conduit opening at one end into said chamber and opening at the other end to the atmosphere, said conduit including the bore of the cylinder intermediately along the length of the conduit, the piston having a peripheral recess capable of providing a communication to complete the conduit, said recess being positioned on the piston such that when the piston is at rest position under its spring-loading the recess completes the conduit and when the piston has moved more than a predetermined distance against its spring-loading the recess is moved out of correspondence with the conduit and the piston then closes the conduit.

References Cited in the file of this patent

UNITED STATES PATENTS

| | | |
|---|---|---|
| 898,606 | Rohrbacher | Sept. 15, 1908 |
| 917,740 | Anderson | Apr. 6, 1909 |
| 1,987,505 | Edler | Jan. 8, 1935 |
| 2,214,963 | Jurs | Sept. 17, 1940 |
| 2,504,720 | Nixon | Apr. 18, 1950 |
| 2,563,192 | Scruggs | Aug. 7, 1951 |
| 2,840,104 | Shafer | June 24, 1958 |

FOREIGN PATENTS

| | | |
|---|---|---|
| 645,056 | Germany | May 20, 1937 |